Oct. 10, 1950   M. J. DE VILLE   2,525,654
FEED SAVER
Filed March 31, 1947
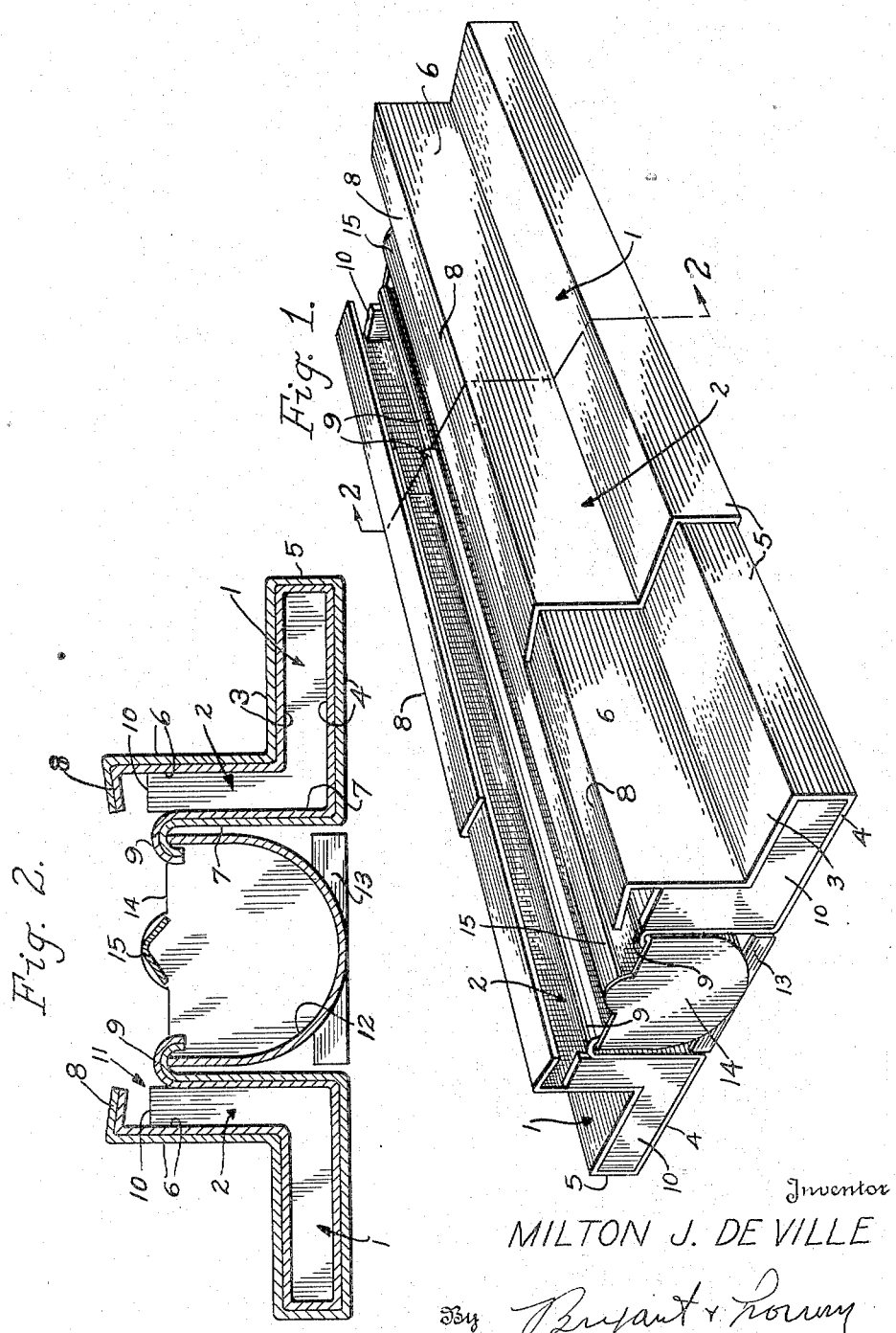
Inventor
MILTON J. DE VILLE
By Bryant & Lowry
Attorneys Patented Oct. 10, 1950

2,525,654

UNITED STATES PATENT OFFICE 2,525,654

FEED SAVER

Milton J. De Ville, Bossier City, La.

Application March 31, 1947, Serial No. 738,452

5 Claims. (Cl. 119—61)

This invention relates to feeding troughs in general, but more particularly it deals with novel attachments thereto, whereby food which might ordinarily be scattered by the animals or fowls feeding therefrom, will not be wasted but will be caught and saved for later replacement in the feeding trough.

The present invention includes such attachments as a part of a novel feeding trough combination, as well as the novel attachments per se, which may be adapted to fit any length of feeding trough.

The object of this invention is to provide shielding or guard means extending over the sides of the trough and spaced therefrom to catch any spilled or scattered food and direct it into narrow receptacles formed along the sides of the trough, which are removable and may be emptied from time to time into said trough.

Another object is to make the above means of light sheet metal and of such dimensions as to not interfere with the normal feeding of the animals.

Another object is to make the shielding receptacle means with a hooked edge for attachment over the edge of the side of a trough.

Another object is to make the above defined means in telescopic form, wherein two halves, each provided with an end, will telescope in the middle, for adjustment of the overall length, to fit any length of trough within the range of the two halves.

Another object is to extend the receptacles outwardly from the trough at the bottom to form a platform from which the animals might feed and to provide a larger capacity for the dislodged food, since the receptacles must necessarily be very narrow in order not to interfere too much with normal feeding.

Other and more specific objects will become apparent in the following detailed description of one form of device illustrating the present invention, having reference to the accompanying drawing, wherein:

Figure 1 is a perspective view of a telescopic form of feed saver attached to the sides of a feeding trough, and Figure 2 is a cross-sectional view taken on line 2—2 of Figure 1.

The feed saving platforms or receptacles are arranged at each side of a trough and are of generally angular channel formation, being L-shaped in cross section, as shown in Figure 2, and comprise a base or horizontal platform portion 1 and an upright portion 2.

The guard receptacles at each side of the trough are formed of elongated telescoping sections of substantially the same length to provide for maximum extension of the telescoping sections to accommodate mounting thereof on troughs of varying lengths. The two telescoping sections of each guard receptacle are of identical construction, except that one section is slightly smaller than the other section to facilitate telescopic assembly, and the description of one of said sections will suffice for all of the sections.

Each section of the guard receptacle includes the base or platform portion 1 having spaced top and bottom walls 3 and 4 connected by an outer perpendicular end wall 5. The bottom wall 4 is of greater width than the top wall 3 and the inner ends of the two walls 3 and 4 respectively carry upwardly extending walls 6 and 7, the upper end of the wall 7 terminating below the upper end of the wall 6. A relatively short arcuately angled wall 8 is carried by the upper edge of the forwardly extending wall 6 and overlies the open upper end of the upright portion 2 of the receptacle to form a partial covering therefor, while the upper end of the wall 7 is outwardly arcuately flanged as at 9. Each section is closed at its outer end by a vertical wall 10. The telescopic association of the two sections of each guard receptacle is clearly illustrated by the drawings and it will be seen that a restricted feed entrance space 11 is present between the upper ends of the walls 6 and 7.

A guard receptacle is associated with each side of a feed trough, the latter being indicated by the reference character 12 and may be of a curved channel formation as shown in Figure 2, the trough being mounted on transversely extending base bars 13. Each end of the trough 12 is closed by an end wall 14 and a carrying bar 15 extends between the upper edges of the end walls 14 of the trough to facilitate placement of the trough in the desired location. A guard receptacle is associated with each side of the trough 12 and has the upper arcuate flange 9 thereof engaged with the upper adjacent longitudinal edges of the trough.

The trough may be of any particular type, depending on the type of feed used and the animals or fowls to be fed. In general, it will have some length and depth, and will have straight side edges over which the hooked edges 9 may be hung. It will be observed, however, that there are no restricting devices over the top of the trough, such as separator bars, openings, etc., for the individual animals, to restrict their normal head motions during feeding, such as e. g. the instinctive tossing of the head by chickens; and natural freedom of motions is assured. This gives the animals more confidence, and prevents injuries, while at the same time the shielding and receptacle means provides a much more efficient feed saver, since hardly any feed is tossed over the shields or guards, and all the displaced feed is saved in the receptacles so that it may later be readily restored in the trough. In the case of the telescopic form, the device may be turned up to let all the food go to one end of the receptacle, before separating the halves and emptying the feed through the open end of the half having all the food in it.

The shape and size of trough and the corresponding dimensions of the attachment devices will depend on the type of feed and animals to be fed. Accordingly, modifications thereof may be made without departing from the spirit and scope of the present invention, as defined in the appended claims.

What is claimed is:

1. In an animal feeding trough, a feed saver attachment comprising a receptacle along the side of said trough having an opening directed inwardly over the edge of said trough for catching feed spilled or scattered from said trough, said receptacle having a portion extending outwardly along the lower portion thereof to form a platform for the feeding animals and to provide extra capacity for the receptacle.

2. A feed saver as defined in claim 1, wherein said receptacle is made in two telescopic parts adjustable lengthwise, to fit troughs of different lengths.

3. In a feed saver attachment for troughs, wherein an attachment is detachably engaged with each of the opposite side edges of a trough, said attachment including overlapping telescopic receptacles adapted to be adjusted to extend the entire length of the trough and there being restricted entrance openings at the upper ends of the receptacles above the upper edges of the trough and disposed laterally of the trough.

4. In a feed saver attachment for troughs, wherein an attachment is detachably engaged with each of the opposite side edges of a trough, said attachment including overlapping telescopic receptacles adapted to be adjusted to extend the entire length of the trough, and there being restricted entrance openings at the upper ends of the receptacles above the upper edges of the trough and disposed laterally of the trough, and a wall on the attachment above the opening for directing scattered feed downwardly into the receptacle.

5. In a feed saver attachment for troughs, wherein an attachment is detachably engaged with each of the opposite side edges of a trough, said attachment including overlapping telescopic receptacles adapted to be adjusted to extend the entire length of the trough, and there being restricted entrance openings at the upper ends of the receptacles above the upper edges of the trough and disposed laterally of the trough, the attachments being substantially L-shaped with the vertical portion adjacent the trough and the lower horizontal portion extending outwardly of the trough to provide a platform.

MILTON J. DE VILLE.

REFERENCES CITED

The following references are of record in the file of this patent:

UNITED STATES PATENTS

| Number | Name | Date |
|---|---|---|
| 341,211 | Beazley | May 4, 1886 |
| 1,899,519 | Nielsen | Feb. 28, 1933 |
| 1,993,445 | Hemstreet | Mar. 5, 1935 |
| 2,062,239 | Thomsen | Nov. 24, 1936 |